United States Patent [19]

Clegg

[11] Patent Number: 4,659,191
[45] Date of Patent: Apr. 21, 1987

[54] CONICAL SPLIT-IMAGE MICROSCOPIC LENS NO. 3

[76] Inventor: John E. Clegg, 2320 Keystone Dr., Orlando, Fla. 32806

[21] Appl. No.: 751,105

[22] Filed: Jul. 2, 1985

[51] Int. Cl.$^4$ .............................................. G02B 13/18
[52] U.S. Cl. .................................................... 350/432
[58] Field of Search .......................................... 350/432

[56] References Cited

U.S. PATENT DOCUMENTS

| | | | |
|---|---|---|---|
| 4,277,148 | 7/1981 | Clegg | 350/432 |
| 4,325,612 | 4/1982 | Clegg | 350/432 |
| 4,333,713 | 6/1982 | Clegg | 350/432 |
| 4,492,438 | 1/1985 | Clegg | 350/432 |
| 4,492,439 | 1/1985 | Clegg | 350/432 |
| 4,521,085 | 6/1985 | Clegg | 350/432 |

Primary Examiner—John K. Corbin
Assistant Examiner—Rebecca D. Gass

[57] ABSTRACT

A conical magnifying stage lens M:RT-TR-2RT:C comprising four component lenses with concave conical, convex conical and planar sections (faces). An afocal indicent beam from the object is refracted and enlarged two times and emitted parallel to the incident beam and the optic axis. The stage lenses can be stacked vertically to produce multiple magnification of images.

1 Claim, 2 Drawing Figures

CONICAL SPLIT-IMAGE MICROSCOPIC LENS NO. 3

BACKGROUND

The code designation of the stage lens is M:RT-TR-2RT:C (M-magnifying stage lens, R-refracting section of a component lens, T-transmitting section of a component lens, and C-concentrating stage lens).

Prior art includes the Conical Split-Image Microscopic Lens, U.S. Pat. No. 4,277,148, 7/7/81, by this inventor. The upper component lens of this stage lens is defective in that it does not refract the beam at the proper angle. The Conical Split-Image Microscopic Lens No. 2, Ser. No. 631,739, filed 7/17/84, corrected the defect of the earlier lens by replacing the defective component lens with a proper lens and increasing the power from 7.07X to 50X.

The stage lens being disclosed herein replaces the large lower component lens of the No. 1 and No. 2 stage lenses with two smaller component lenses.

DRAWINGS

DESCRIPTION

Figure 1:
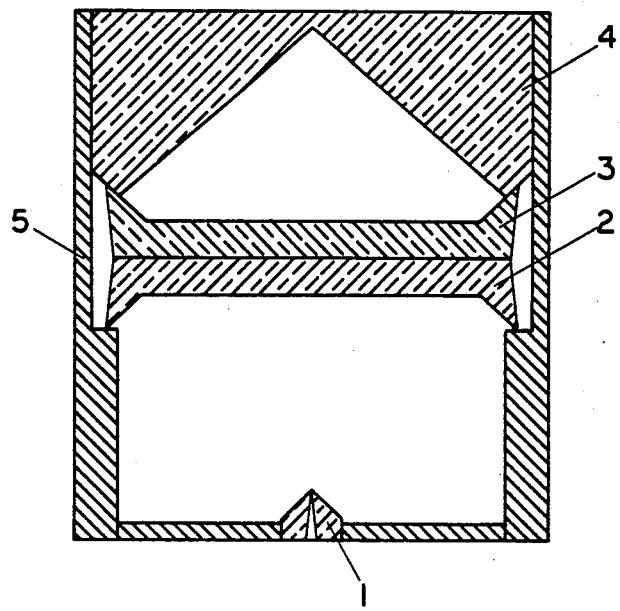
FIG. 1 is an elevation of the conical split-image microscopic lens No. 3 with the component lenses shown in section.

FIG. 1 is an elevation of the conical split-image microscopic lens No. 3 M:RT-TR-2RT:C showing lower component lens RT 1, first middle component lens TR 2, second middle component lens RT 3 and upper component lens RT 4 mounted inside casing 5.

Figure 2:
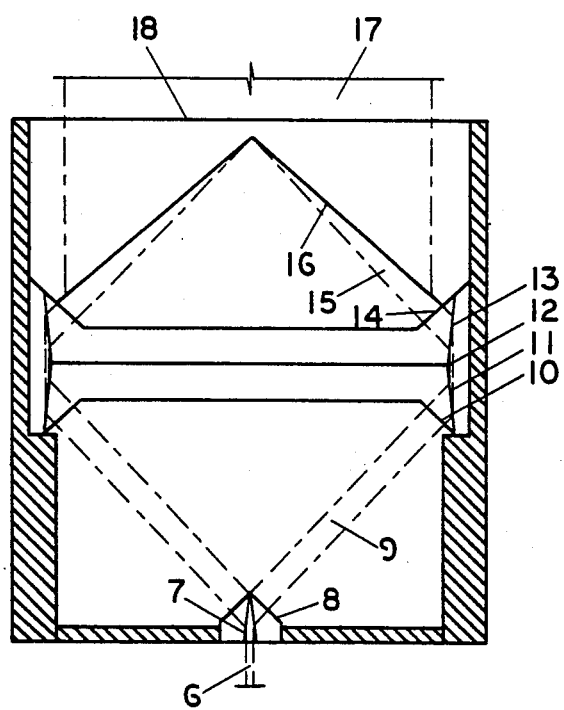
FIG. 2 is an elevation of the stage lens with a ray diagram.

FIG. 2 is an elevation of the stage lens with a ray diagram. Incident beam 6 from the object is refracted by concave conical section 7 and emitted by convex conical section 8, forming divergent conical beam 9.

Beam 9 is transmitted by concave conical section 10 and refracted by convex conical section 11, forming annular beam 12 which is emitted parallel to incident beam 6 and to the optic axis.

Beam 12 is refracted by convex conical section 13 and transmitted by concave conical section 14, forming convergent conical beam 15.

Beam 15 is refracted by concave conical section 16, forming concentrated circular whole beam 17 which is emitted by planar section 18 parallel to incident beam 6 and to the optic axis.

The first and last refractions increase the diameter of the beam by a factor of 7.07X, yielding a total magnification of 50X. The two intermediate refractions are directional.

I claim:

1. A conical split-image microscopic lens No. 3 M:RT-TR-2RT:C comprising;
   a. A lower component lens RT (1) with a concave conical section (7) which refracts an incident beam (6), forming divergent conical beam (9) which is transmitted by convex conical section (8),
   b. A first middle component lens TR (2) with a concave conical section (10) which transmits beam (9) and with a convex conical section (11) which refracts beam (9), forming annular beam (12),
   c. A second middle component lens RT (3) with a convex conical section (13) whith refracts beam (12), forming convergent conical beam (15) which is transmitted by concave conical section (14), and
   d. An upper component lens RT (4) with a concave conical section (16) which refracts beam (15), forming concentrated circular whole beam (17) which is emitted by planar section (18) parallel to incident beam (6) and to the optic axis.

* * * * *